No. 671,611.  
E. E. POAG.  
SHINGLE SAWING MACHINE.  
(Application filed Oct. 27, 1900.)  
Patented Apr. 9, 1901.
(No Model.)
3 Sheets—Sheet 1.
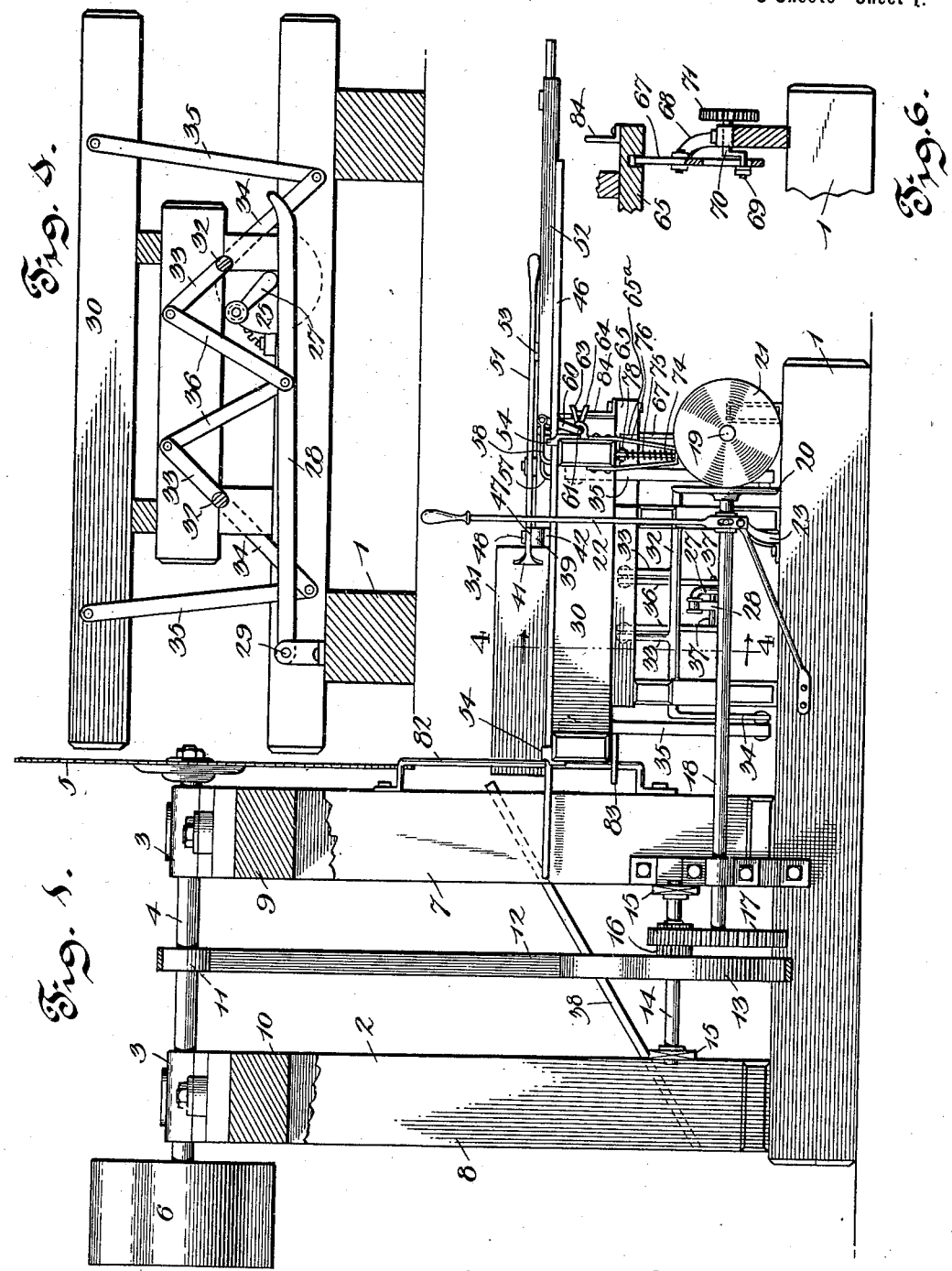

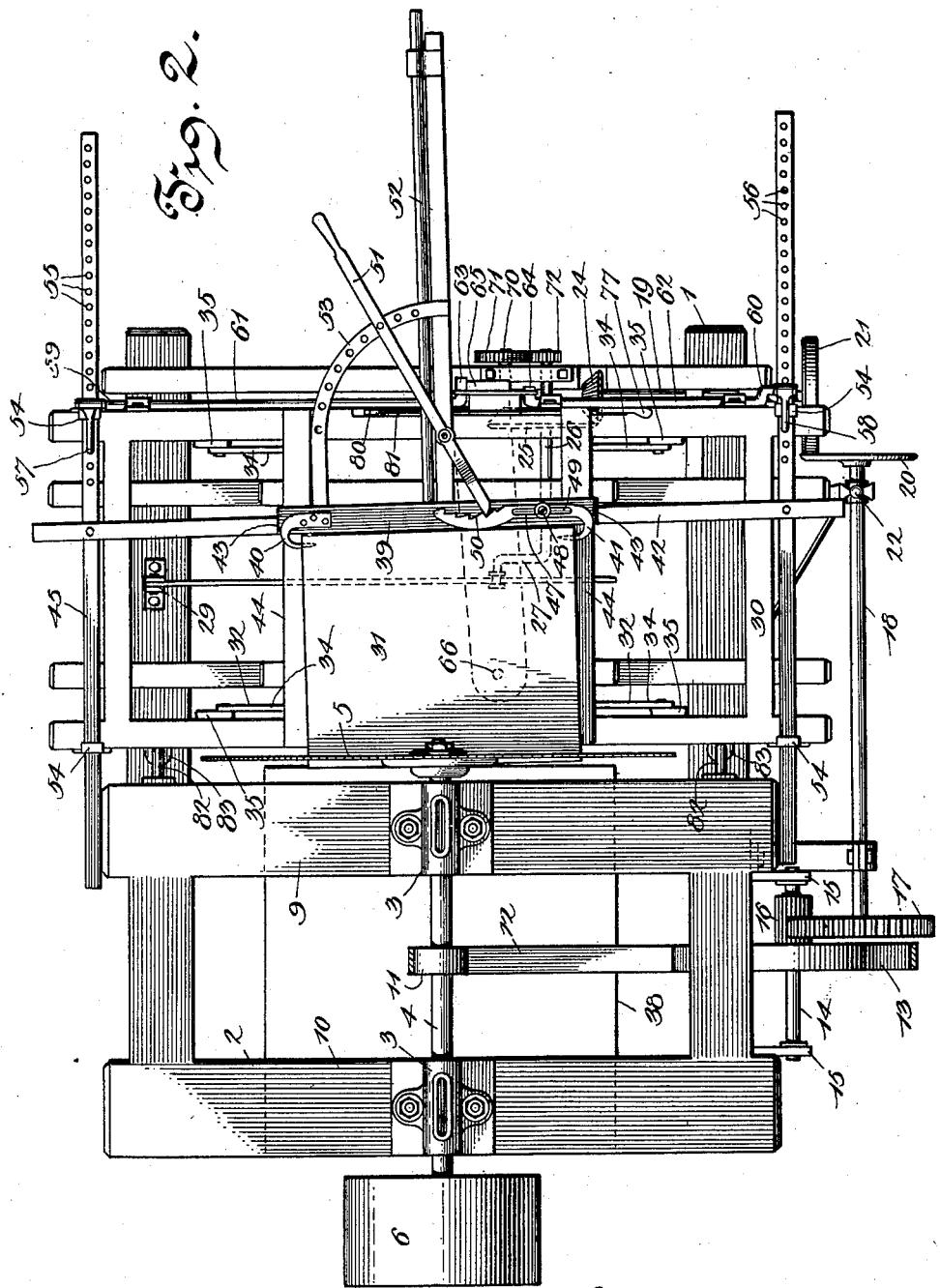

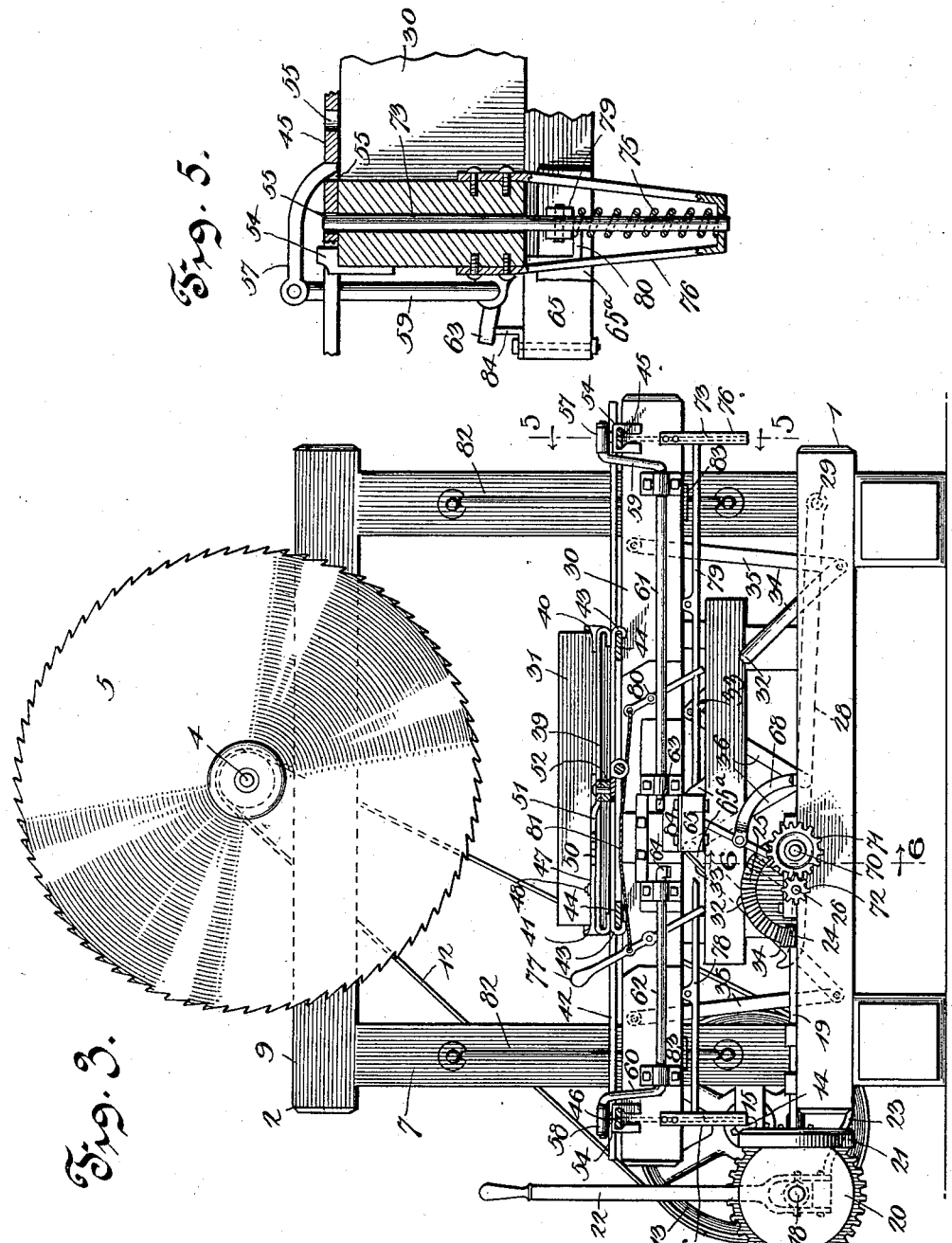

UNITED STATES PATENT OFFICE.

EDGAR E. POAG, OF ROCKHILL, SOUTH CAROLINA.

SHINGLE-SAWING MACHINE.

SPECIFICATION forming part of Letters Patent No. 671,611, dated April 9, 1901

Application filed October 27, 1900. Serial No. 34,630. (No model.)

*To all whom it may concern:*

Be it known that I, EDGAR E. POAG, a citizen of the United States, residing at Rockhill, in the county of York and State of South Carolina, have invented a new and useful Shingle-Sawing Machine, of which the following is a specification.

The invention relates to improvements in shingle-sawing machines.

The object of the present invention is to improve the construction of shingle-sawing machines and to provide a simple and comparatively inexpensive one adapted to feed a block of wood to a saw and capable of automatically oscillating or shifting the block to position it properly for cutting a shingle at the proper angle.

The invention consists in the construction and novel combination and arrangement of parts hereinafter fully described, illustrated in the accompanying drawings, and pointed out in the claims hereto appended.

In the drawings, Figure 1 is an end elevation of a shingle-sawing machine constructed in accordance with this invention. Fig. 2 is a plan view of the same. Fig. 3 is a front elevation. Fig. 4 is a vertical sectional view on the line 4 4 of Fig. 1. Fig. 5 is a similar view on the line 5 5 of Fig. 3. Fig. 6 is a vertical sectional view on the line 6 6 of Fig. 3.

Like numerals of reference designate corresponding parts in all the figures of the drawings.

1 designates a main frame provided with a vertical rear portion 2, extending above the front portion and provided at the top with bearings 3, receiving a saw arbor or shaft 4, carrying a circular saw 5 at its front end and having a pulley 6 keyed or otherwise secured to its rear end and adapted to be connected by a belt with the power for operating the shingle-sawing machine. The rear portion of the frame is approximately rectangular, being composed of vertical posts 7 and 8, connected at their upper ends by longitudinal and transverse beams 9 and 10, as clearly shown in Figs. 1 and 2 of the accompanying drawings. The saw arbor or shaft 4, which extends across the center of the rear portion of the main frame, is provided at its center with a small pulley 11, which is connected by a belt 12 with a large pulley 13, mounted at one side of the rear portion of the main frame in suitable bearings. The large pulley 13 is keyed or otherwise secured to a shaft 14, and the bearings thereof are arranged at the outer ends of arms 15. The shaft 14, which is short, as clearly shown in Figs. 2 and 3, carries a small pinion 16, which meshes with a cog-wheel 17 of a shaft 18, located at the same side of the frame as the short shaft 14 and extending to the front of the frame and connected at that point by frictional gearing with a short front shaft 19, journaled in suitable bearings and arranged at right angles to the shaft 18. The side shaft 18, which extends from the rear to the front of the machine, is adapted to slide longitudinally in its bearings to carry a friction-disk 20 into and out of engagement with a friction-disk 21, which is mounted on the shaft 19. The shaft 18 may be shifted by any suitable means to engage the disk 20 with the disk 21 and to disengage the said disks; but it is preferably connected with a shifting lever 22, fulcrumed at its lower end on a suitable bracket 23 and connected between its ends with the shaft, as clearly illustrated in Fig. 1 of the accompanying drawings.

The gearing extending from the saw-arbor is designed, as hereinafter explained, for operating the means for feeding the shingle-block and for positioning the same so that it will be presented to the saw at the proper angle for cutting a shingle, and when the frictional gearing is thrown out of gear the machine will be stopped.

The shaft 19 is provided at its inner end with a bevel-pinion 24, meshing with a bevel gear-wheel 25, which is mounted on a shaft 26, arranged parallel with the side shaft 18 and extending rearward from the front of the frame, at a point near the center thereof, and provided at its inner end with a crank 27. The crank 27 is arranged to engage one end of an oscillating lever 28, extending transversely of the main frame and fulcrumed at its outer end 29 at the side opposite that at which the shaft 18 is located. The rotation of the shaft 26 through the means hereinafter described raises and lowers a vertically-movable frame 30, which carries a shingle-block into and out of engagement with the saw 5. A pair of rock-shafts 32 is journaled in suitable bearings on the front portion of the main frame, and these shafts 32, which are located at opposite sides of the center of the main frame, are provided with inner and outer arms 33 and 34, extending upward and downward from the shafts 32 in diametrically opposite directions. Each shaft 32 is provided at its ends with the said outer arms 34, which are connected by links 35 with the vertically-movable frame 30 at points near the end thereof, and the inner arms 33, which extend upward from the rock-shafts 32, are connected by inner links 36 with the transverse lever 28, which is provided with laterally-extending pivots 37. When the lever 28 is swung downward by the rotation of the shaft 26, the inwardly and upwardly extending arms 33 are carried downward and the outer arms are swung upward, thereby lifting the links 35 and raising the frame 30 vertically. This movement carries the shingle-block into engagement with the circular saw, which cuts a shingle from the said block, and the said shingle is discharged from the machine by an inclined chute 38, located at the back of the main frame and extending downward and outward.

The block 31 is secured to a carriage 39 by means of a clamp consisting of a pair of dogs 40 and 41, arranged at opposite sides of and embedded in the said block, as clearly illustrated in Fig. 2 of the accompanying drawings. The carriage consists, essentially, of a transverse bar 42, provided with depending inwardly-extending flanges 43, which engage longitudinal ways 44, consisting of bars mounted on the vertically-movable frame. The transverse bar is pivotally connected near its ends with a pair of longitudinally-movable ratchet-bars 45 and 46, adapted to be alternately advanced by the means hereinafter described to oscillate the block 31 horizontally and set it at the proper angle for cutting a shingle. The dog 40 is rigid with the carriage, and it has an engaging portion or bill located adjacent to one of the ways 44, and the other dog, which is provided with a slotted shank 47, is secured to the carriage by means of a suitable fastening device 48, passing through the slot 49. The shank 47 is also provided with a series of ratchet-teeth 50, which are adapted to be engaged by a lever 51, fulcrumed between its ends on a longitudinal bar 52 of the carriage and adapted to be secured to a segment 53. The segment 53 is provided with a series of perforations adapted to receive a pin or other suitable fastening device for holding the lever. The segment 53 consists of a curved bar or piece located at one side of the longitudinal bar 52 and extending therefrom to the transverse bar, which forms the body portion of the carriage.

The longitudinally-movable ratchet-bars 45 and 46, which are mounted in suitable guides 54, are provided with perforations 55 and 56, which are adapted to be engaged by dogs 57 and 58, located at opposite sides of the machine, as clearly shown in Fig. 2 of the accompanying drawings. These dogs are connected with outer arms 59 and 60 of transverse rock-shafts 61 and 62, journaled in suitable bearings on the vertically-movable frame and provided at their inner ends with arms 63 and 64, which are adapted to engage alternately a movable device 65, whereby the rock-shafts are alternately operated to feed and ship the shingle-block to position the latter properly with relation to the saw. The outer arms of the transverse rock-shafts form cranks, and the dogs 57 and 58 are provided with suitable openings to receive the outer portions of the crank-arms 59 and 60. The inner arms 63 and 64 extend forwardly and are bent at right angles, and the movable device 65 consists of a longitudinally-disposed bar or lever pivoted at its rear end at 66 to the front portion of the frame and connected at its front end with an oscillatory lever 67, whereby it is shifted from a point beneath one of the inner arms of the transverse rock-shaft 61 and 62 to a position beneath the other inner arm, whereby when the vertically-movable frame descends one of the arms will be carried into engagement with the block or lever of the movable device 65 to actuate one of the ratchet-bars. The lever 67, which is arranged in an upright position, is fulcrumed on a curved arm or bracket 68, and its lower end is connected with a crank 69 of a short shaft 70, arranged parallel with the shaft 26 and connected at its outer end with the same by gearing. The lower end of the oscillating lever 67 is slotted to receive the crank 69; but any other means may be provided for permitting the necessary play of the parts, and the upper end of the oscillating lever may be connected with the outer end of the movable device 65 by any suitable means. The crank-shaft 70 is provided at its outer end with a gear-wheel 71, which meshes with a pinion 72 of the shaft 26, whereby motion is communicated therefrom to the oscillatory lever.

The ratchet-bars are locked against movement to hold the carriage rigidly in position while the frame 30 is moving upward and while the saw is making a cut by means of a pair of spring-actuated locking-rods 73 and 74, located at opposite sides of the vertically-movable frame 30 and extending through suitable perforations thereof. The rods are normally held in engagement with the ratchet-bars by coiled springs 75, supported by stirrups 76, which depend from the vertically-movable frame, as clearly shown in Figs. 1 and 3. The vertically-movable spring-actuated locking-pins may be released by means of an operating-lever 77, which is connected with a pair of horizontal levers 78 and 79, fulcrumed between their ends beneath the vertically-movable frame and connected at their outer ends to the locking pins or rods. The inner end of the horizontal lever 78 is directly engaged by the lower end of the operating-lever 77, and the inner end of the other lever 79 is engaged by an upright lever 80, arranged parallel with the operating-lever 77 and fulcrumed between its ends on the vertically-movable frame. The upper end of the lever 80 is connected by a wire cable 81 or other suitable flexible connection with the upper arm of the operating-lever 77, and when the latter is oscillated both locking-pins will be withdrawn from engagement with the ratchet-bars. The lever 77 is designed to be operated for disengaging both of the locking-pins from the ratchet-bars when it is desired to move the carriage backward for placing another shingle-block on the machine. The locking-pins are alternately released to permit the operation of the feeding mechanism, and the said movable device 65, which is engaged by the rock-shafts, is provided at opposite sides with beveled faces $65^a$, adapted to engage the inner ends of the levers 78 and 79. When the movable device 65 is shifted to the right for operating the right-hand rock-shaft, it lifts the inner end of the right-hand lever 79 and withdraws the right-hand locking-pin from engagement with the right-hand ratchet-bar. When the movable device 65 is shifted to the left-hand side, the other lever 78 is similarly operated to release the left-hand ratchet-bar.

The rear portion of the frame may be provided with vertical guides 82, consisting of rods having their ends angularly bent and secured to the posts 7. The vertically-movable frame will then be provided with suitable eyes 83, receiving the vertical guides and arranged, preferably, at the bottom of the movable frame, as clearly illustrated in Fig. 1 of the accompanying drawings.

The movable device which operates the transverse rock-shafts for feeding the shingle-block is preferably provided at its front or outer end with an approximately L-shaped piece 84, forming an upwardly-extending flange, as clearly shown in Fig. 1.

It will be seen that the shingle-sawing machine is simple and comparatively inexpensive in construction, and that it automatically feeds the shingle-block to the saw and alternates the said block in opposite direction to set it at the proper angle for cutting a shingle. It will also be apparent that the carriage is rigidly locked to the vertically-movable frame on the upward movement of the latter and that the downward movement of the said frame operates the feeding mechanism.

Changes in the form, proportion, size, and the minor details of construction within the scope of the appended claims may be resorted to without departing from the spirit or sacrificing any of the advantages of this invention, such as increasing the size of the saw and the other parts of the machine, to enable more than one block to be cut at each upward movement, to provide a machine of the desired capacity, and any suitable gearing may be employed for connecting the shafts 18 and 19 to vary the speed of the machine.

What I claim is—

1. In a machine of the class described, the combination of a vertically-movable frame, a carriage mounted on the frame and adapted to receive the block to be cut, feeding devices located at opposite sides of the block and adapted to oscillate the same, and a movable device adapted to be moved from one side to the other and capable of alternately operating the feeding mechanism, substantially as described.

2. In a machine of the class described, the combination of a main frame, a saw, a vertically-movable frame, a carriage mounted on the vertically-movable frame and adapted to receive the block to be cut, feeding devices located at opposite sides of the block and adapted to alternately oscillate the same to place the block in an angular position with relation to the saw, a pivoted device mounted on the main frame, and means for continuously oscillating the pivoted device, whereby it is alternately carried into engagement with the feeding devices, substantially as described.

3. In a machine of the class described, the combination of a main frame, a saw mounted thereon, a vertically-movable frame, a carriage mounted on the vertically-movable frame and adapted to receive the block to be cut, feeding devices located at opposite sides of the block and connected with and adapted to alternately actuate the same, rock-shafts mounted on the movable frame and connected with and adapted to operate the feeding devices, and a movable device mounted on the main frame and adapted to alternately engage the rock-shafts on the downward movement of the vertically-movable frame, substantially as described.

4. In a machine of the class described, the combination of a main frame, a saw, a vertically-movable frame, a carriage mounted on the vertically-movable frame and adapted to receive the block to be cut, feeding devices located at opposite sides of the block and adapted to actuate the carriage, rock-shafts connected with the feeding devices and provided with arms, a movable device mounted on the main frame and located beneath and adapted to alternately engage the said arms to rotate the rock-shafts, and means for shifting the movable device from one arm to the other, substantially as described.

5. In a machine of the class described, the combination of a main frame, a vertically-movable frame, a saw, a carriage mounted on the vertically-movable frame, feeding devices located at opposite sides of the carriage and connected with the same, rock-shafts connected with the feeding devices and provided with arms, a movable device mounted on the main frame, an oscillating lever connected with the movable device and adapted to carry the same from one arm to the other, whereby the rock-shaft will be alternately engaged, and gearing connected with the saw for oscillating the lever, substantially as described.

6. In a machine of the class described, the combination of a main frame, a vertically-movable frame, a carriage mounted on the vertically-movable frame and adapted to receive the block to be cut, feeding devices located at opposite sides of the carriage and adapted to alternately actuate the same, rock-shafts mounted on the vertically-movable frame and provided with inner and outer arms, the outer arms being connected with feeding devices, the pivoted device mounted on the main frame and located beneath the rock-shafts, and means for oscillating the pivoted device for carrying the same beneath the inner arms of the rock-shafts, substantially as described.

7. In a machine of the class described, the combination of a main frame, a vertically-movable frame, a carriage mounted on the vertically-movable frame, ratchet-bars located at opposite sides of the carriage and pivotally connected to the same and guided on the vertically-movable frame, dogs arranged to engage the ratchet-bars, rock-shafts carrying the dogs, and a movable device mounted on the main frame and adapted to be alternately engaged by the rock-shafts, substantially as described.

8. In a machine of the class described, the combination of a main frame, a vertically-movable frame, a carriage mounted on the vertically-movable frame, ratchet-bars guided on the vertically-movable frame and connected with the carriage, dogs engaging the ratchet-bars, rock-shafts connected with the dogs a movable device mounted on the main frame and adapted to be alternately engaged by the rock-shafts, the locking pins or rods engaging the ratchet-bars and adapted to hold the carriage rigidly to the vertically-movable frame on the upward movement of the same, and means for withdrawing the locking pins or rods from engagement with the ratchet-bars, substantially as described.

9. In a machine of the class described, the combination of a main frame, a vertically-movable frame provided with central ways and having side guides, a carriage mounted on the central ways and adapted to receive the block to be cut, ratchet-bars mounted in the guides and connected with the carriage, feeding devices for alternately advancing the ratchet-bars, a movable device adapted to be shifted from one side to the other and capable of alternately operating the feeding mechanism, and locking devices for engaging the ratchet-bars, substantially as described.

10. In a machine of the class described, the combination of a main frame, a vertically-movable frame, a carriage mounted on the vertically-movable frame and adapted to receive the block to be cut, the ratchet-bars guided on the vertically-movable frame and provided with perforations, the vertically-movable spring-actuated rods mounted on the vertically-movable frame and located beneath the ratchet-bars and engaging perforations thereof, feeding devices for alternately advancing the ratchet-bars, a movable device adapted to be shifted from one side to the other and capable of alternately operating the feeding devices, and means for operating the spring-actuated rods, substantially as described.

11. In a machine of the class described, the combination of a vertically-movable frame, a carriage adapted to receive the block to be cut, ratchet-bars connected with the carriage, means for alternately advancing the ratchet-bars, spring-actuated locking devices engaging the ratchet-bars, the approximately horizontal levers fulcrumed between their ends and connected at their outer terminals with the locking devices, and the upright levers fulcrumed between their ends and connected at their lower ends with the horizontal levers, said upright levers being connected together at their upper portions, and one of the upright levers forming an operating-lever, substantially as described.

12. In a machine of the class described, the combination of a main frame, a vertically-movable frame, the opposite rock-shafts journaled on the main frame and provided with inner and outer arms, links connecting the outer arms with the vertically-movable frame, an oscillating lever connected with the inner arms, and gearing for operating the lever, substantially as described.

13. In a machine of the class described, the combination of a main frame, a vertically-movable frame, the outer links connected at their upper ends with the vertically-movable frame, the inner links, the lever devices connected with the lower ends of the outer links and with the upper ends of the inner links, and means connected with the lower ends of the inner links for actuating the lever devices, substantially as described.

14. In a machine of the class described, the combination of a main frame, a vertically-movable frame, a saw-arbor mounted on the main frame, rock-shafts journaled on the main frame and connected with the vertically-movable frame, and gearing connected with the saw-arbor and with the rock-shafts and adapted to raise and lower the vertically-movable frame, substantially as described.

15. In a machine of the class described, the combination of a main frame, a saw-arbor, a vertically-movable frame, rock-shafts journaled on the main frame and connected with the vertically-movable frame, an oscillating lever connected with and adapted to actuate the rock-shafts, a crank-shaft arranged to engage the said lever, and gearing connecting the crank-shaft with the saw-arbor, substantially as described.

16. In a machine of the class described, the combination of a main frame, a vertically-movable frame, rock-shafts journaled on the main frame and connected with the vertically-movable frame, the lever 28 connected with the rock-shafts, a saw-arbor, the side shaft 18, gearing connecting the shaft 18 with the saw-arbor, the shaft 19 connected with the shaft 18 and with the shaft 26 by suitable gearing, a carriage mounted on the vertically-movable frame, feeding devices for alternately moving the carriage, a shifting device for actuating the feeding devices, and gearing connected with the shaft 26, for actuating the shifting device, substantially as described.

In testimony that I claim the foregoing as my own I have hereto affixed my signature in the presence of two witnesses.

EDGAR E. POAG.

Witnesses:
 H. J. PRICE,
 W. L. OWENS.